J. YOCOM.
BELT SHIFTER FOR CHANGE SPEED MECHANISM.
APPLICATION FILED DEC. 29, 1916.
1,256,418.
Patented Feb. 12, 1918.
2 SHEETS—SHEET 1.
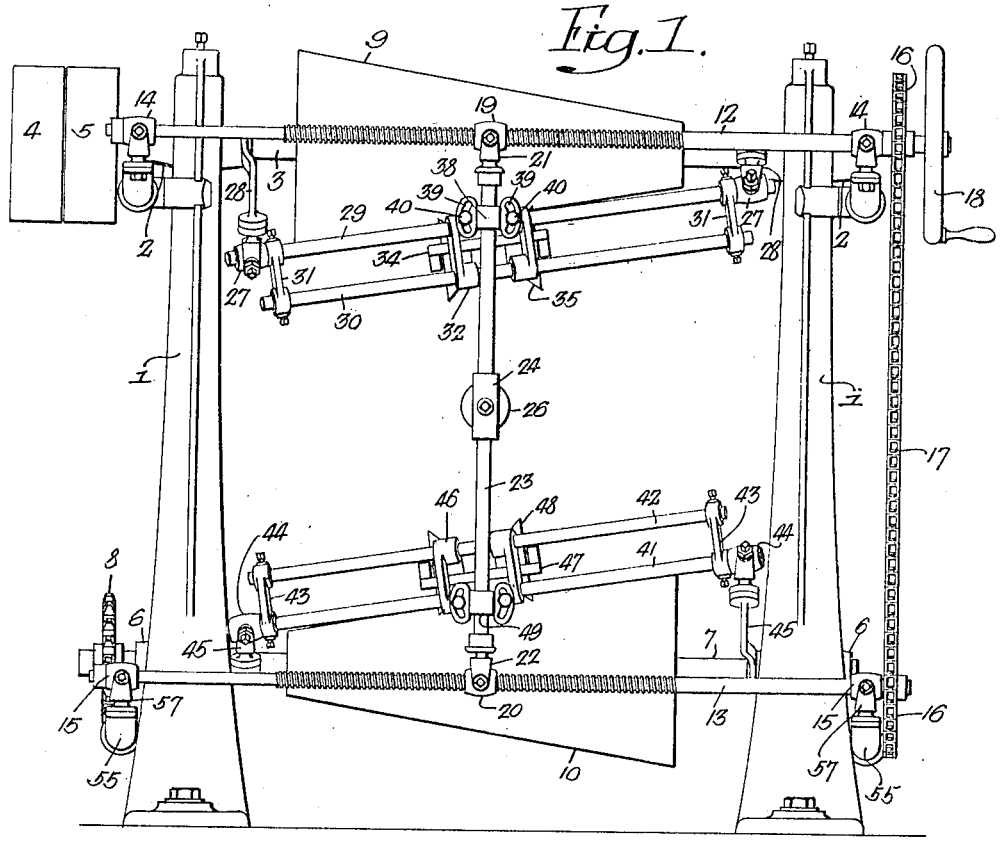
Fig. 1.
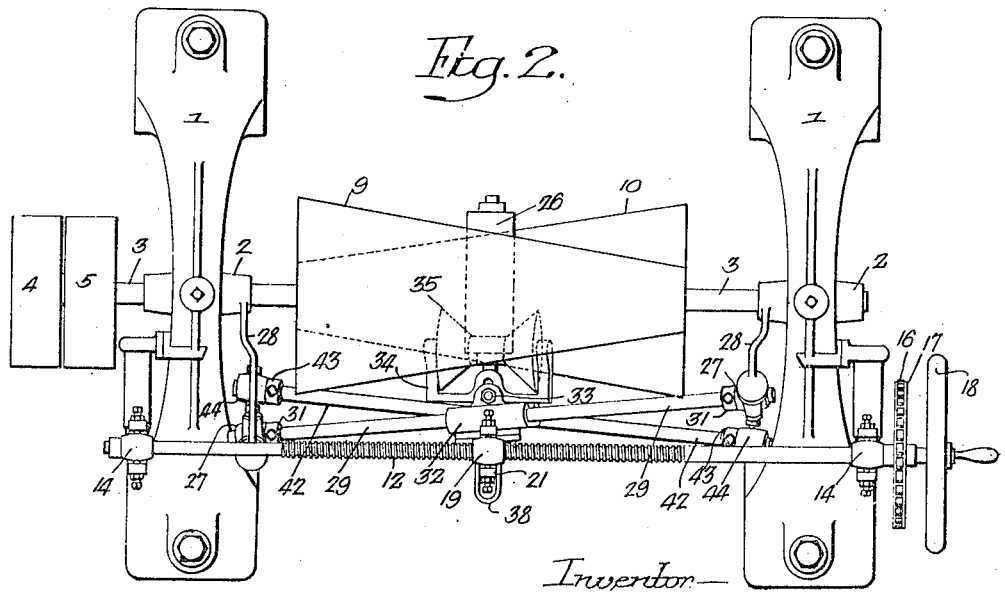
Fig. 2.
Inventor—
James Yocom, by his Attorneys,
Howson & Howson

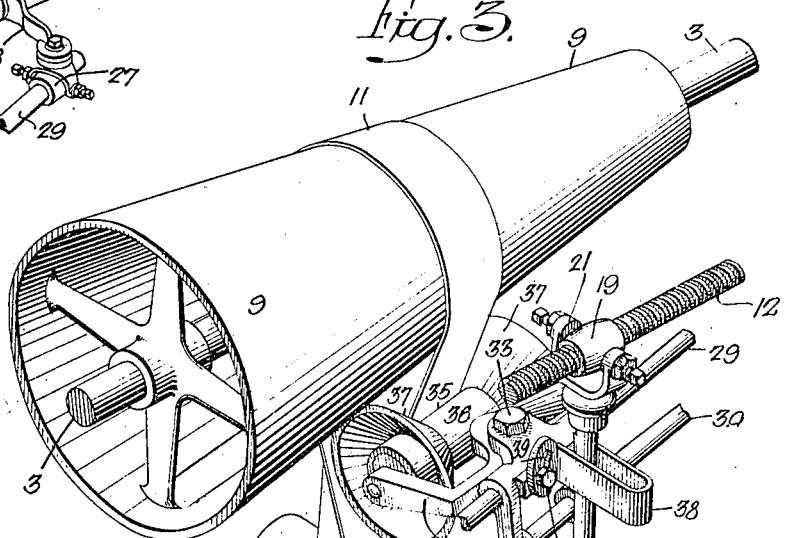

UNITED STATES PATENT OFFICE.

JAMES YOCOM, OF PHILADELPHIA, PENNSYLVANIA.

BELT-SHIFTER FOR CHANGE-SPEED MECHANISM.

1,256,418.  Specification of Letters Patent.  Patented Feb. 12, 1918.

Application filed December 29, 1916. Serial No. 139,551.

*To all whom it may concern:*

Be it known that I, JAMES YOCOM, a citizen of the United States, residing in Philadelphia, Pennsylvania, have invented certain Improvements in Belt-Shifters for Change-Speed Mechanism, of which the following is a specification.

One object of my invention is to improve the mechanism for shifting the belt of a change speed gear in which conical pulleys are used so as to readily shift the belt on the cone pulleys and also to hold the belt in the position to which it is set and to prevent it from working up the cone as the mechanism is driven.

The invention also relates to certain details of construction which will be fully described hereinafter.

In the accompanying drawings:

Figure 1 is a side view of a change speed mechanism illustrating my invention;

Fig. 2 is a plan view;

Fig. 3 is an enlarged perspective view showing the cone pulleys, the belt shifting mechanism and the belt in position;

Fig. 4 is a detached perspective view of one of the upper bearings showing the bracket and the bearing for one of the guide rods;

Fig. 5 is a detached plan view of the upper carriage;

Fig. 6 is a detached plan view of the frame and the double cone roller;

Fig. 7 is a detached perspective view of the guide strap; and

Fig. 8 is a detached sectional view of one of the lower bearings for the screw shaft.

Referring to the drawings, 1, 1 are the standards, in the present instance, each having an upper bearing 2 for the driving shaft 3 on which are the fast and loose pulleys 4 and 5. On the standards are the lower bearings 6 in which is mounted the driven shaft 7, in the present instance, having a sprocket wheel 8. On the driving shaft 3 is a long cone pulley 9 and on the lower shaft is a cone pulley 10 arranged opposite to the cone pulley 9, the wide end of the cone pulley 10 being opposite to the small end of the cone pulley 9.

11, Fig. 3, is the belt which is twisted and passes around both cone pulleys 9 and 10, as clearly shown in said figure. 12 and 13 are upper and lower screw shafts mounted in bearings 14 and 15 respectively, and on each shaft is a sprocket wheel 16 around which passes a belt chain 17. On the upper shaft 12, in the present instance, is a hand wheel 18 by which the said shaft is turned. The shaft 13 is turned in unison with the shaft 12 through the chain 17 and the sprocket wheel 16. Arranged to travel on the upper screw shaft 12 is a nut 19 and on the lower screw shaft is a nut 20. These nuts are mounted in swivel bearings 21 and 22 respectively, and are connected by a rod 23. As the screw shafts are turned, the two nuts and the rod move over the faces of the cone pulleys in unison.

The lower bearings 15 for the screw shaft 13 are mounted on adjustable brackets 51, Fig. 8. The section 52 is fixed to the standard and the section 53 has a spindle adapted to a socket in the section 52 and also has a socket arranged to receive a spindle 54 on the section 55, which is connected by a swivel joint to the forked section 57 which carries the bearing 15. By this construction, the bearings are universally adjustable.

Secured to the rod 23 at or near the center is a bearing 24 having a spindle 25 on which is mounted a long roller 26, the roller being free to turn on the spindle and held from moving longitudinally by collars, one of which is shown in Fig. 3. This roller 26 extends between the two runs of the belt, and it not only separates them, acting as an anti-friction roller, but it also holds the belt in position and prevents the belt from working toward the large end of the cone pulley, which all belts have a tendency to do, owing to the fact that they travel on a conical surface and are twisted, as shown.

Mounted on brackets 28 projecting from the main bearings 2 of the shaft 3 is a rod 29 extending substantially parallel with the cone pulley 9. 30 is a second rod running parallel with the first rod 29 and rigidly connected to it by bearings 31 forming guides for the carriage 32. Pivoted to the carriage at 33 is a frame 34 carrying a double cone roller 35 having a flat portion 36 and conical flanges 37.

I preferably make the two flanges adjustable in respect to the body portion and they are held in the adjusted position by set screws. By this means, the cones can be adjusted to fit belts of different widths.

The roller 35 is so adjusted as to bear against the belt 11, as clearly shown in Fig. 3.

38 is a U-shaped strap, which passes around the rod 23 and is secured to the carriage 32. In the present instance, the strap has slots 39 through which pass bolts 40 by which it is adjustably secured to the carriage so that when the screw shafts 12 and 13 are turned the nuts are traversed on the screw shaft, together with the rod and the carriage 32, with its roller 35, travels with the rod and the nut, due to the fact that the strap 38 spans the rod.

At the lower cone pulley 10 is a diagonal rod 41 running substantially parallel with the face of the pulley and paralleling this rod is a rod 42 connected by bearings 43. The rod 41 is mounted in bearings 44 carried by brackets 45 secured to the main bearings 6 of the shaft 7. Arranged to travel on the rods 41 and 42 is a carriage 46 to which is pivoted a frame 47 having a roller 48 with conical flanges similar to the roller 35. 49 is a strap which spans the lower end of the rod 23 and is adjustably secured to the carriage 46 in the same manner that the strap 38 is secured to its carriage 32.

By this construction, both ends of the belt are traversed on the pulleys simultaneously so as to change the speed, while the roller 26 holds the belt in proper position and prevents it from moving longitudinally on the pulleys after it is once adjusted.

In order that both the upper and the lower frames 34 and 47 may be adjusted so that the rollers will bear properly on the belt 11, I mount the upper and lower frames on the pivot pins 33 and 33ᵃ respectively, and these frames are preferably slotted, as shown at 50, Fig. 6, so that the frame can be turned on the pin 33 and can also be moved bodily toward and from the belt so that it will have a proper bearing on the belt and thus adapt the belt to cone pulleys of different sizes and contour. The bearings 27 and 44 are adjustable on their brackets and the rods 30 and 42 can be adjusted to any angle desired by shifting the bearings 31 and 43 respectively, as the guide rods are rigidly held in position by the set screws on said bearings 31 and 43, and by adjusting the straps 38 and 49 so that they will have the proper bearing on the rod 23, but it will be seen that a standard device can be used having pulleys different in diameter and also differing in taper.

The operation is as follows:

If pulleys such as shown in the drawings be used, then the rods are adjusted so as to properly conform with the pulleys. The roller 26, which is located between the runs of the belt, is adjusted so as to have the proper bearing against the belt. When the device is set in motion, the belt will remain where adjusted so that the driving element will be driven at a uniform speed from the driven element, and the speed of the driven element can be readily changed by turning the screw shafts so as to shift the carriage and the roller longitudinally in respect to the pulleys.

I claim:

1. The combination in change speed mechanism, of two shafts; a cone pulley on each shaft; inclined guides near each cone pulley; a carriage adapted to travel on the guides; a flanged roller on each carriage; a belt passing around both cone pulleys and twisted and engaged by the flanged rollers; two feed screws; nuts on the feed screws; a rod connecting the nuts and engaging the carriage; and means for turning the feed screws in unison.

2. The combination of two shafts; a cone pulley on each shaft; two inclined guides; a screw at each guide; a nut on each screw; a rod connecting the two nuts; two belt shifters controlled by the screws; a spindle carried by the rod and having a roller; a belt passing around the two cone pulleys and twisted, said roller extending between the two runs of the belt.

3. The combination of two shafts; a cone pulley on each shaft; a twisted belt extending from one pulley to the other; a pair of inclined guides near each cone pulley; a screw shaft at each cone pulley; a nut on each screw shaft; a rod connecting the nuts; a spindle on the rod; a roller mounted to turn freely on the spindle and extending between the two runs of the belt; a carriage arranged to travel on the guide rods; a frame adjustable on each carriage; a double cone roller mounted on each frame and arranged to engage the belt; and means connecting the screw shafts so that they will turn in unison.

4. The combination of two shafts; a cone pulley on each shaft; a belt passing around both cone pulleys; two inclined guide rods extending parallel with each other and located near each cone pulley; bearings in which the said rods are adjustably mounted; a carriage adapted to travel on each pair of guide rods; a pivoted frame secured to each carriage; a double cone roller on each frame arranged to engage the belt; a strap adjustably mounted on each carriage; two feed screws; means for connecting the screws so that they will be driven in unison; a rod connecting the two nuts; said rod extending through the straps so that when the nuts travel on the feed screws they will traverse the carriage on the guide rods and shift the belt.

5. The combination of two shafts; a cone pulley on each shaft; a belt passing around both cone pulleys and twisted; two screw shafts extending parallel with the main shafts; means coupled to the two screw shafts so that they will turn in unison; a nut on each shaft; a rod connecting the nuts; two sets of inclined guide rods near each cone pulley, said rods being inclined in substantially the same line as the face of the cone; bearings for one rod of each set in which the said rod can be adjusted; a carriage adapted to each set of rods; a strap adjustably mounted at each carriage and spanning the rod connecting the two nuts and through which the carriage is moved on the rods; a double cone roller carried by the frame and arranged to engage the belt, each frame having a slot; a pin on the carriage adapted to the slot so that the frame can be adjusted on the pin as a pivot to move bodily toward and from the belt.

6. The combination in a change speed gear, of two cone pulleys; a belt passing around the cone pulleys; a double cone roller having a body portion and two adjustable conical flanges mounted thereon; and means for securing the flanges in position.

In witness whereof I affix my signature.

JAMES YOCOM.